United States Patent [19]

Josephson

[11] 4,323,961

[45] Apr. 6, 1982

[54] FREE-RUNNING FLYBACK DC POWER SUPPLY

[75] Inventor: Elliot Josephson, Los Altos, Calif.

[73] Assignee: Astec Components, Ltd., Santa Clara, Calif.

[21] Appl. No.: 186,454

[22] Filed: Sep. 12, 1980

[51] Int. Cl.³ ............................................ H02H 7/122
[52] U.S. Cl. ...................................... 363/56; 363/21; 363/80
[58] Field of Search ....................... 363/19, 20, 21, 56, 363/79, 80, 97

[56] References Cited

U.S. PATENT DOCUMENTS

| | | | |
|---|---|---|---|
| 3,771,040 | 11/1973 | Fletcher et al. | 321/2 |
| 4,037,271 | 7/1977 | Keller | 363/21 |
| 4,063,307 | 12/1977 | Stephens | 363/56 X |
| 4,092,708 | 5/1978 | Gerding et al. | 363/56 |
| 4,128,866 | 12/1978 | Doerre | 363/15 |
| 4,130,862 | 12/1978 | Holt | 363/49 |
| 4,209,826 | 6/1980 | Priegnitz | 363/21 |
| 4,236,187 | 11/1980 | Mochizuki et al. | 363/21 X |

Primary Examiner—William M. Shoop

Attorney, Agent, or Firm—Fitch, Even, Tabin, Flannery & Welsh

[57] ABSTRACT

A free-running flyback DC power supply includes a transformer having at least one primary and one secondary winding, a transistor switch in series with the primary winding for controlling when current from a source of DC power is coupled through said winding, and a rectifier circuit attached to the secondary winding for generating a DC output voltage. A conventional regulator circuit causes the transistor switch to turn off primary winding current as a function of the present value of DC output voltage. A second circuit senses excessive current in the primary winding and causes the transistor switch to turn off independently of said regulator circuit, to protect against damage to the transistor switch or transformer. A third circuit detects when the DC source voltage is below a predetermined minimum and causes the transistor switch to turn off independently of said regulator circuit. Regulation of the output DC voltage is also maintained as a function of the present value of DC source voltage. An additional circuit causes the regulator circuit to turn off the transistor switch early if the DC output voltage drops below a predetermined minimum.

18 Claims, 2 Drawing Figures

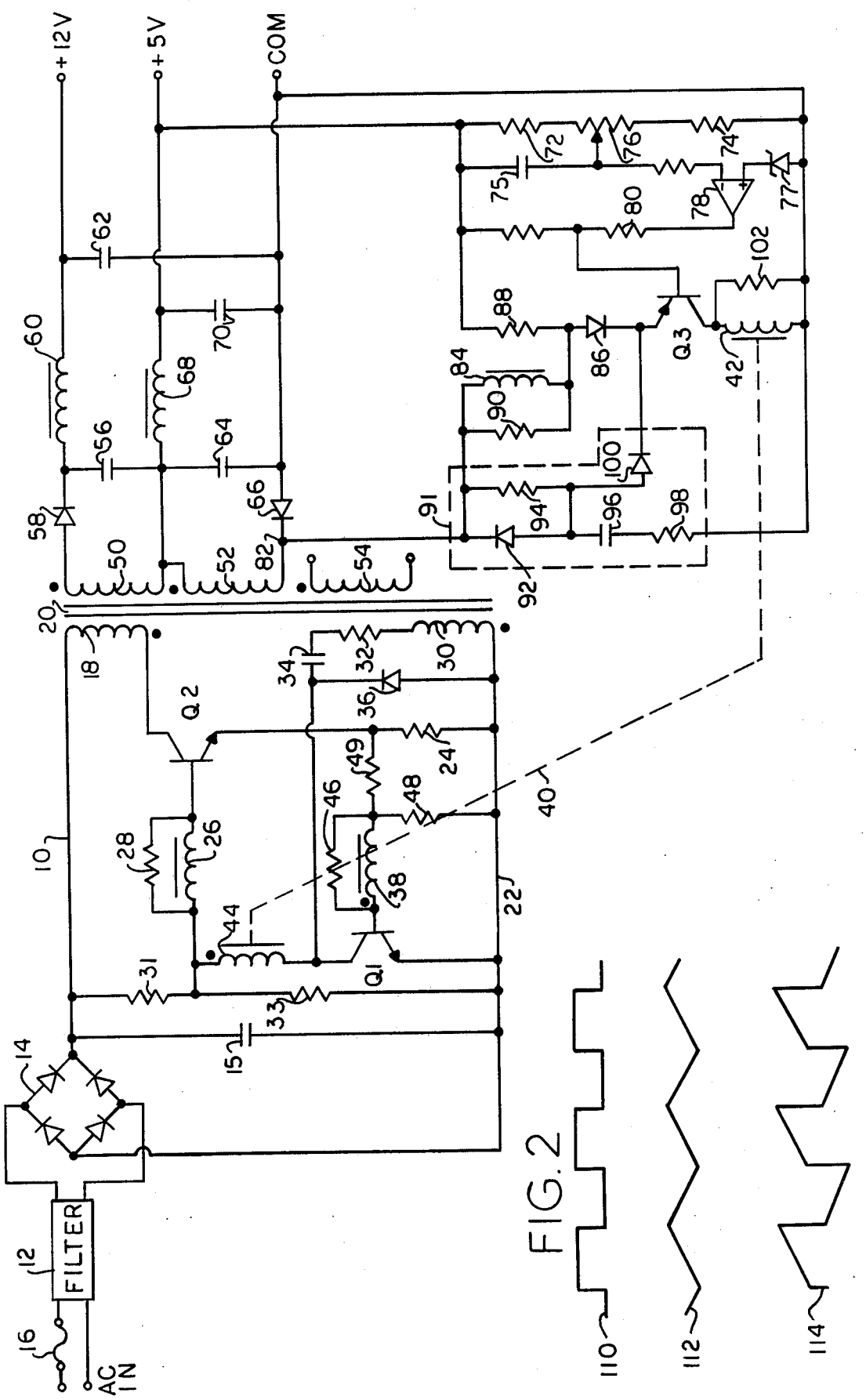

FREE-RUNNING FLYBACK DC POWER SUPPLY

This invention relates in general to DC power supplies, and more particularly to a free-running flyback power supply.

DC flyback power supplies are well known in the art. Such supplies use a power transformer to convert a first DC potential to one or more second DC potentials. A flyback type of power supply is one in which power is first transferred to the power transformer via the primary winding, and, after conduction in the primary winding has ceased, the stored power is coupled out through the secondary winding to an output rectifier circuit for generating the desired output DC voltage level. Regulation of this output voltage level is accomplished by controlling the amount of energy stored in the magnetic field of the transformer during each cycle. Generally, the on-time and off-time of a transistor switch connected to the primary winding of the power transformer is controlled to provide this function.

With negative feedback of the output voltage, a transformer-coupled switching regulator is created. Normally, the regulator samples the output DC voltage, compares it with a voltage reference, and uses the resultant error voltage signal to control the transistor switch. This error signal is usually fed to the transistor switch through some type of isolation circuit to maintain isolation between the input power and the power generated by the supply. In order to properly regulate between a no-load and a maximum-load condition, it is apparent that the transistor switch must continually oscillate to produce a minimum of on-time at a no-load condition and a maximum of on-time at maximum load.

The output rectifier circuit generally includes a diode in series with the power transformer secondary winding and a capacitor in parallel with the secondary winding and diode. In operation, when the transistor switch is closed, the diode is reverse biased by the secondary winding, thereby blocking current flow in the secondary winding. During this time, the capacitor must maintain the output DC voltage level and supply the total output current. Of course, this capacitor needs to be large enough to supply this current with a minimum amount of voltage degradation for the maximum time that the transistor switch is normally closed. Subsequently, when the transistor switch is opened, there is an inductive voltage step across the primary and secondary windings, which drives the secondary winding in an opposite polarity, thereby forward biasing the diode. With the primary winding now open circuited, the energy that had been stored in the primary windings is delivered out of the secondary winding and into the capacitor. This replenishes the charge the capacitor lost when the transistor switch was closed and it was furnishing the load current itself. The level of DC output voltage which is output by the capacitor is a function of not only the time that the transistor switch is open and closed and the source voltage level, but also the number of windings in the primary and secondary windings. It is also common to cause the transistor switch to turn on and turn off with a frequency above 20,000 Hz to keep it above the range of hearing.

Since all the energy must be stored in the magnetic field of the transformer in each cycle, only so much energy can be contained therein. If such a transformer were driven to saturation during a fault condition, the inductance in the transformer falls to zero, causing the current to rise excessively. The transistor switch would probably be destroyed as a result of such currents.

In addition, the transistor switch is often not turned off in an efficient and speedy manner, thereby dissipating power in a wasteful manner. Prior art power supplies have also been deficient in being able to compensate quickly for changes in the level of the unregulated input DC or line voltage coupled to the supply.

Therefore, an object of the present invention is to provide a free-running DC flyback power supply wherein the power transformer switching transistor is protected from overcurrent conditions.

A further object of the present invention is to provide a DC flyback power supply wherein the transistor switch is turned off in a clean, efficient manner to minimize waste of power.

Another object of the present invention is to provide a DC flyback power supply wherein the transistor switch is turned off faster when input DC source voltage drops below a certain level.

Another object of the present invention is to provide open loop regulation of the output DC voltage in a DC flyback power supply as a function of the present level of input DC source voltage.

A still further object of the present invention is to provide a DC flyback power supply wherein the output DC voltage regulator causes the transistor switch to turn off faster if output voltage drops below a predetermined level.

Yet another object of the present invention is to maximize isolation between the primary and secondary sides of the power supply according to the present invention through the use of an isolation transformer.

These and other objects and advantages of the present invention will become more apparent upon reference to the accompanying description and following drawings in which:

FIG. 1 is a schematic diagram of a DC flyback power supply according to the present invention; and FIG. 2 is a timing diagram illustrating the operation of a portion of the circuit of FIG. 1.

Broadly stated, the present invention is directed to a free-running flyback DC power supply including a power transformer having a primary winding and a secondary winding, one end of the primary winding being coupled to a source of DC and its other end connected to electrical switching means. This switching means, when closed, causes power to be stored in the power transformer. When the electrical switching means is subsequently opened, this stored power is enabled to be output through said secondary winding. A rectifier means is attached to the secondary winding for generating an output DC voltage from the power stored in the transformer. Feedback is provided by a pulse generator means which generates a pulse whose timing is a function of the present DC output voltage level. This pulse is coupled to the switching means, causing it to switch off. The present invention is directed towards means for switching off the electrical switching means under additional circumstances, i.e., when the source of DC drops below a predetermined minimum, or when the current through the switching means exceeds a predetermined maximum. Also included are means for causing the time of occurrence of said pulse to be regulated as a function of the level of said DC source, and means for causing said pulse to be generated earlier when the output voltage is below a predetermined minimum.

FIG. 1 illustrates a schematic diagram of a preferred embodiment of a DC free-running flyback power supply according to the present invention. Referring now to FIG. 1, an unregulated DC source 10 is obtained in a conventional manner, such as from an AC power source coupled through a filter 12, a diode bridge 14 and one or more capacitors 15. A fuse 16 may also be provided for protection from any short circuit in the power supply.

The DC source 10 is coupled through a primary winding 18 of a power transformer 20 as a function of the state of a switching transistor Q2 whose collector is connected to the other end of primary winding 18. The emitter of transistor Q2 is coupled to the common return line 22 of the DC source through a resistor 24. DC source 10 may conventionally provide an unregulated voltage of about 300 volts. The maximum power normally fed to a flyback transformer is in the neighborhood of 100 to 150 watts.

Connected in series with the base of the switching transistor Q2 is an inductor 26 with a resistor 28 connected in parallel thereto. The purpose of inductor 26 is to give a negative swing to the base of transistor Q2 after turn off of Q2 has been initiated. Resistor 28 is needed for damping purposes, to prevent inductor 26 from going too far in a negative direction.

The base of transistor Q2 is fed from the DC source 10 by means of two bleed resistors 31 and 33. These resistors act as starting resistors for coupling enough current into the base of Q2 to initiate the first switching on of this transistor. Resistor 31 is connected in series between the DC source and the base of transistor Q2. Resistor 33 is needed to insure that the DC source voltage 10 is up to a reasonable level before switching on of transistor Q2 is enabled.

Once operation of transistor Q2 has been initiated, current is coupled to the base of Q2 to provide continuous drive current therefor by means of a circuit including a second primary winding 30 of transformer 20, a resistor 32 and a capacitor 34 all connected in series between the return of the DC source 22 and the base of transistor Q2. A diode 36 is connected in parallel with primary winding 30, resistor 32 and capacitor 34 to provide a return path to recharge capacitor 34 when transistor Q2 is off and power transformer 20 is in its flyback mode.

Turn off of switching transistor Q2 is accomplished by means of a second transistor Q1 also connected to the base of transistor Q2 through inductor 26. The base of Q1 is fed by a secondary winding 38 of an isolation transformer 40 whose primary winding 42 is positioned on the secondary side of power transformer 20. Further details of this feedback portion of the power supply according to the present invention is given hereinbelow. A second secondary winding 44 of isolation transformer 40 is connected in series between the collector of transistor Q1 and the base of transistor Q2 also for reasons as hereinafter described. A resistor 46 is connected in parallel with secondary winding 38 to provide a degree of damping for this winding, and resistors 48 and 49 provide additional biasing for transistor Q1.

The secondary side of transformer 20 includes one or more secondary windings shown respectively at 50, 52 and 54 which are coupled to adjacent rectifier means. Each rectifier means generates an output DC voltage from the power that is output from its respective secondary winding. Such power transfer occurs during the flyback mode of the power transformer 20. These rectifiers are conventional, secondary winding 50 being connected to a capacitor 56 through a diode 58, with the voltage generated thereby being coupled out of the power supply through a conventional filter including an inductor 60 and capacitor 62. The exemplary output voltage of this network is +12 volts.

A second secondary winding, shown at 52, would provide an exemplary +5 volts, again by means of a capacitor 64 and diode 66 coupled through a filter including an inductor 68 and capacitor 70.

One or more additional secondary windings 54 may be used to generate different voltages, including negative voltages, as is common in the art.

Feedback regulation of the output voltages generated by the flyback power supply according to the present invention is provided by the following circuits. The output voltage from one of the output voltage lines is fed through a voltage dividing network comprising resistors 72, 74 and potentiometer 76, and fed through the negative input of an operational amplifier 78. The other input of operational amplifier 78 is fed from a voltage reference level, e.g., 2.5 volts provided by a zener diode 77. Capacitor 75 provides phase compensation to further stabilize the feedback loop. The output of amplifier 78 comprises an error voltage signal which is fed through a resistor 80 to the base of a control transistor Q3 providing an operating or bias point therefor. The emitter of control transistor Q3 is fed from a ramp generator means which generates a positive going ramp signal when switching transistor Q2 is closed, to provide a turn-on point for transistor Q3.

The ramp signal is generated from the square wave voltage signal that exists on secondary winding 52 of transformer 20. The ramp generator interrupts this square wave to obtain a triangle wave, one half of which is used as the ramp signal. The slope of the ramp is determined by the level of voltage at point 82. The integrator comprises an inductor 84, whose output ramp signal is fed to the emitter of transistor Q3 through a diode 86. Biasing of this integrator is provided by a resistor 88 coupled to the output DC voltage. Resistor 90 generates a step function in the ramp generated by inductor 84 to provide a cleaner turn off for transistor Q3 and to provide a greater initial voltage level to the ramp signal which is needed by transistor Q3 when a light or no-load condition is being experienced by the power supply output.

Also connected to the emitter of transistor Q3 is a foldback current limiter circuit. This circuit, shown at 91, provides a means for causing transistor Q3 to turn on earlier than would otherwise occur with the above described circuitry, when the output voltage of the power supply drops below a predetermined minimum. This circuit generates a second ramp signal of a predetermined slope to turn on the transistor when the ramp voltage exceeds the bias voltage on the base of transistor Q3. This circuit includes a diode 92 in parallel with a resistor 94 connected to point 82 at one end, and a capacitor 96 and resistor 98 connected in series to the other end. The output of this circuit is coupled to the emitter of transistor Q3 by means of a diode 100.

When transistor Q3 turns on, it generates a pulse through the primary winding 42 of isolation transformer 40 to thereby generate a turn-off of transistor Q2 as above described. A resistor 102 is connected in parallel with the primary winding 42 to provide damping of this winding.

There are three modes of operation for switching off switching transistor Q2. All are initiated by turning on second transistor Q1. Transistor Q1 provides this function since when on, it creates a low resistive path between the common return 22 of the DC source and the base of transistor Q2. As mentioned above, the base of transistor Q2 is driven by a second primary winding 30 on transformer 20 through resistor 32 and capacitor 34. With transistor Q2 on, the dot point on winding 30 is negative, and the undotted side is positive. During flyback, with transistor Q2 off, capacitor 34 is recharged through diode 36 from the common return 22.

The main mode in which Q1 is turned on and thus Q2 turned off is the normal operating mode of the feedback regulation circuit. In this mode, on the secondary side of the power supply, transistor Q3 drives a pulse into winding 42 of isolation transformer 40. This causes the dotted side of secondary winding 38 to go positive turning on transistor Q1. Since a second winding 44 of transformer 40 is attached to the collector of transistor Q1, once the base goes positive, a voltage is produced in this collector winding which reinforces the base drive voltage of winding 38. This circuit is therefore regenerative causing transistor Q1 to go into saturation essentially until the core of isolation transformer 40 also saturates. Note that transistor Q1 is only on to initiate flyback. As soon as transformer 40 saturates, or the base of transistor Q2 goes negative, transistor Q1 goes back off. When the polarity of winding 30 reverses, with the dotted side now negative, capacitor 34 is recharged through diode 36.

A second mode of transistor Q1 turn-on and thereby transistor Q2 turn-off, is where the power supply is not in regulation and the current in transistor Q2 reaches a maximum allowable safe point short of the saturation point of transformer 20. Resistor 24 provides this function, having a value defined such that at this maximum current point, a voltage is generated across resistor 24 of a sufficient magnitude to cause transistor Q1 to turn on and initiate flyback. Resistor 24 is needed to turn off transistor Q2 mainly during start up of the power supply, when the output voltage is still rising to its final value and something is needed to control the state of transistor Q2 so that the transformer is not saturated. Saturation of transformer 20 is to be avoided since once saturation occurs, the inductance of the transformer is lost, and the current in transistor Q2 can rise without bound.

The third mode of turning on transistor Q1, and thereby turning off transistor Q2, is initiated when the voltage level of the unregulated DC source connected to primary winding 18 of transformer 20 drops below a predetermined minimum value. During normal operation when transistor Q2 is on, the current fed through primary winding 18 continues to rise until transistor Q2 is turned off. If the DC source voltage were low, transistor Q2 would come out of saturation before it is turned off by transistor Q1. The result is a very slow rate of turn-off of transistor Q2. The third turn-off mode is needed to get a clean, fast turn-off of transistor Q2.

More specifically, while transistor Q2 is on, its collector current is rising because it's looking into a transformer winding, winding 18, having a relatively low value of inductance. If the base current feeding transistor Q2 is insufficient because of insufficient DC source voltage, transistor Q2 comes out of saturation and causes the collector voltage of transistor Q2 to start to climb. As this collector voltage starts to climb, this increasing voltage is inductively coupled through transformer 20 to the base drive primary winding 30. The voltage on this winding 30 reverses, causing the current to pull in the opposite direction through capacitor 34 and secondary winding 44. Since this winding 44 is also coupled to the base drive winding 38 of transistor Q1, being part of the isolation transformer 40, this increases the voltage at the dot point on the base of transistor Q1 causing transistor Q1 to turn on. As a result, transistor Q2 is turned off at a much faster rate than would otherwise be possible.

Transistor Q2 is turned back on either after all energy has been output through secondary winding in the power transformer 20 at the end of flyback, or at a predetermined time prior to this point. A clock can be used to turn transistor Q2 back on after a predetermined length of time, or the transformer 20 state can be monitored to determine when all of the energy has been delivered out of the transformer. In the present invention the latter approach is taken. When flyback ends, the voltage at the collector of transistor Q2 beings to fall, since there is no longer any means in transformer 20 to maintain that maximum voltage. Once this voltage begins to fall, it causes the base drive winding 30 to rise in voltage, which retriggers transistor Q2.

A pulse is generated on the secondary side of transformer 20 and then fed back to transistor Q1 to cause transistor Q2 to go off. This pulse is timed not just to provide conventional regulation of the level of output voltage, but in addition, to provide secondary regulation of the output voltage as a function of the present DC source voltage level. This secondary regulation is open loop in the sense that it is accomplished without significant action of the normal feedback loop. In addition, the pulse generating circuit is overridden if the output power supply voltage is sensed as having dropped below a predetermined minimum point.

To provide regulation of the output voltage based on the input DC source voltage, the conventional voltage difference error signal output by operational amplifier 78 is fed into the base of control transistor Q3, thereby biasing transistor Q3 to a certain voltage point which generally varies only slightly when the circuit is in regulation. The DC source voltage level is sensed at point 82 in the form of a square wave, with point 82 being at a positive voltage when transistor Q2 is on, of a level reflecting the voltage of the DC source voltage. This square wave, illustrated in FIG. 2 at 110, is fed across inductor 84 which, in conjunction with resistor 88 integrates this signal. An output triangle waveform is created, as shown at 112. The positive portion of this waveform is a ramp voltage, and is coupled through diode 86 to the emitter of transistor Q3. Thus, as this ramp voltage increases during a normal cycle, it reaches a point wherein it exceeds the voltage at the base of transistor Q3, causing transistor Q3 to turn on. This generates the needed pulse in winding 42.

Note that if the DC source voltage is higher, the slope of the ramp is steeper, while if the DC source is lower than normal the slope of the ramp is lessened. As can be seen, with the steeper ramp caused by higher supply input voltage, transistor Q2 is caused to turn off earlier, which is what is desired, since Q2 need not be on as long when the input voltage is higher. This provides the added benefit that the error output from operational amplifier 78 remains relatively constant with respect to charges in input voltage. This enhances system stability, and improves the transient response of this circuit.

The purpose of resistor 90, which is connected in parallel with inductor 84, is to generate a slightly modified curve, as shown at 114 in FIG. 2. This modified signal provides a stronger signal to the emitter of transistor Q3 when the output of the power supply is coupled either to a no-load or a light load condition.

Finally, the foldback current limiter circuit 91 is a second ramp generator comprising diode 92, resistor 94, capacitor 96, and resistor 98. This circuit generates a second ramp of fixed slope which is also fed to the emitter of transistor Q3. This circuit provides an overriding turn off of transistor Q3 if the output voltage drops below a predetermined amount. As the power supply load increases, the frequency of operation of the supply drops. Since this second ramp signal has a fixed slope, the longer transistor Q2 remains on, the higher this ramp is allowed to go. In overload, with resistor 24 operating to shut off transistor Q2 early, the output voltage of the supply can't be maintained in regulation, so this voltage falls off. When such a low output voltage occurs, the voltage generated at the base of transistor Q3 goes down. This low frequency, low bias state enables this second ramp signal to exceed the base voltage and thus turn on transistor Q3 before the voltage of the ramp signal generated by inductor 84 has gotten high enough to provide this function.

It is of course understood that although the preferred embodiments of the present invention have been illustrated and described, various modifications, alternatives and equivalents thereof will become apparent to those skilled in the art, and, accordingly, the scope of the present invention should be defined only by the appended claims and equivalents thereof.

What is claimed is:

1. A DC power supply comprising:
    a power transformer having a primary winding and a secondary winding, one end of said primary winding being coupled to a source of DC;
    electrical switching means coupled to the other end of said primary winding, said switching means when closed causing power to be stored in said power transformer, and when open enabling said power to be output through said secondary winding;
    rectifier means attached to said secondary winding for generating an output DC voltage from said secondary winding output power;
    pulse generator means for generating a pulse at a point in time after said switching means closes as a function of the present value of said output voltage;
    means for coupling said pulse to said electrical switching means, said pulse causing said electrical switching means to switch off;
    means for switching off said electrical switching means when said source of DC drops below a predetermined minimum;
    means for switching off said electrical switching means when the current through said switching means exceeds a predetermined maximum; and
    means for switching on said electrical switching means at a point in time after the switching off of said switching means.

2. The DC power supply of claim 1 further comprising means for causing the time of occurrence of said pulse to be regulated as a function of the level of said DC source.

3. The DC power supply of claim 1 further comprising means for causing said pulse to be generated earlier when said output voltage drops below a predetermined minimum.

4. A DC power supply comprising:
    a power transformer having a primary winding and a secondary winding, one end of said primary winding being coupled to a source of DC;
    electrical switching means coupled to the other end of said primary winding, said switching means when closed causing power to be stored in said power transformer, and when open enabling said power to be output through said secondary winding, wherein said electrical switching means comprises:
    (i) a switching transistor having a collector, base, and emitter terminal, said collector terminal coupled to said other end of said primary winding, said emitter operatively coupled to the common return of said source of DC;
    (ii) circuit means for providing drive current to the base of said switching transistor, including a second power transformer primary winding, a capacitor, and a resistor connected in series between the common return of said source of DC and the base of said switching transistor; and
    (iii) a diode connected in parallel with said circuit means for recharging said capacitor when said switching transistor is off;
    rectifier means attached to said secondary winding for generating an output DC voltage from said secondary winding output power;
    pulse generator means for generating a pulse at a point in time after said switching means closes as a function of the present value of said output voltage;
    means for coupling said pulse to said electrical switching means, said pulse causing said electrical switching means to switch off;
    means for switching off said electrical switching means when said source of DC drops below a predetermined minimum;
    means for switching off said electrical switching means when the current through said switching means exceeds a predetermined maximum; and
    means for switching on said electrical switching means at a point in time after the switching off of said switching means.

5. The DC power supply of claim 4, wherein said means for coupling said pulse to said electrical switching means comprises:
    an isolation transformer including a primary winding through which said pulse is coupled, and at least one secondary winding;
    a second transistor having a collector, base, and emitter, said collector operatively coupled to the base of said switching transistor, said emitter operatively coupled to the DC source common return, and the secondary winding of said isolation transformer operatively coupled to the base of said second transistor, such that said second transistor is caused to go on by the signal generated in said secondary winding of said isolation transformer by said pulse when said pulse is coupled through said isolation transformer primary winding.

6. The DC power supply of claim 5 wherein said means for switching off said electrical switching means when said source of DC drops below a predetermined minimum comprises:
    a second secondary winding in said isolation transformer connected between said base of said switching transistor and the collector of said second transistor, said circuit means for providing drive current to the base of said switching transistor connected on the second transistor collector side of said second secondary winding, such that when the DC source voltage is low, as the current through the power transformer winding goes up, said switching transistor comes out of saturation causing the voltage at the collector of said switching transistor to rise, said voltage is inductively coupled to said second primary winding of said power transformer causing current to flow through said second secondary winding, which induces a voltage in the secondary winding of said isolation transformer connected to the base of said second transistor, which causes the second transistor to turn on.

7. The DC power supply of claim 5 wherein said means for switching off said electrical switching means when the current through said switching means exceeds a predetermined maximum comprises a resistance means connected in series between the emitter of said transistor and the DC source common return; and means for coupling the voltage signal generated across said resistance means to the base of said second transistor, said voltage signal causing said second transistor to turn on when said voltage signal exceeds a predetermined level.

8. The DC power supply of claim 4 further comprising starting means for initially switching on said electrical switching means, said starting means comprising a resistor coupled in series between said DC source and the base of said transistor.

9. The DC power supply of claim 1 wherein said rectifier means comprises:

a diode coupled in series with said secondary winding of said power transformer oriented to be reverse biased when said electrical switching means is switched on and forward biased when said electrical switching means is switched off; and capacitance means connected in parallel to said diode and said secondary winding.

10. A DC power supply comprising:

a transformer having a primary winding and a secondary winding, one end of said primary winding being coupled to a source of DC;

electrical switching means coupled to the other end of said primary winding, said switching means when closed causing power to be stored in said transformer, and when open enabling said power to be output through said secondary winding;

rectifier means attached to said secondary winding for generating an output DC voltage from said secondary winding output power;

pulse generator means for generating a pulse at a point in time after said switching means closes as a function of the present value of said output voltage and as a function of the level of said DC source;

means for coupling said pulse to said electrical switching means, said pulse causing said electrical switching means to switch off; and means for switching on said electrical switching means at a point in time after the switching off of said switching means.

11. A DC power supply comprising:

a transformer having a primary winding and a secondary winding, one end of said primary winding being coupled to a source of DC;

electrical switching means coupled to the other end of said primary winding, said switching means when closed causing power to be stored in said transformer, and when open enabling said power to be output through said secondary winding;

rectifier means attached to said secondary winding for generating an output DC voltage from said secondary winding output power;

pulse generator means for generating a pulse at a point in time after said switching means closes as a function of the present value of said output voltage and as a function of the level of said DC source, wherein said pulse generator means comprises:

(i) means for comparing the output DC voltage level with an internal reference voltage and for producing an output error voltage that varies with the difference in amplitude between said compared voltages;

(ii) a control transistor, including a base, emitter and collector, said base bias controlled by said output error voltage;

(iii) ramp generator means for generating a ramp signal of increasing magnitude when said electrical switching means is closed, the slope of said ramp signal being a function of the present voltage level of said DC source; and (iv) means for coupling said ramp signal to the emitter of said control transistor, such that an output pulse is generated on the collector of said feedback transistor when the level of said ramp signal exceeds the base bias of said transistor;

means for coupling said pulse to said electrical switching means, said pulse causing said electrical switching means to switch off; and means for switching on said electrical switching means at a point in time after the switching off of said switching means.

12. The DC power supply of claim 11 wherein said ramp generator means comprises an inductor connected in series between one end of said secondary winding and said control transistor emitter and a resistor connected in series between said output DC voltage and said emitter.

13. The DC power supply of claim 12 further comprising a resistor in parallel with said inductor.

14. The DC power supply of claim 11 further comprising means for causing said pulse to be generated earlier when said output voltage drops below a predetermined minimum, said means comprising:

second ramp generator means for generating a ramp signal of a predetermined slope, such that said control transistor is caused to turn on when said ramp voltage exceeds the bias voltage on the base of said transistor.

15. The DC power supply of claim 14 further comprising a first diode connected in series between said first ramp generator means and the collector of said control transistor, and a second diode connected in series between said second ramp generator means and the collector of said control transistor.

16. A DC power supply comprising:

a transformer having a primary winding and a secondary winding, one end of said primary winding being coupled to a source of DC;

electrical switching means coupled to the other end of said primary winding, said switching means when closed causing power to be stored in said transformer, and when open enabling said power to be output through said secondary winding;

rectifier means attached to said secondary winding for generating an output DC voltage from said secondary winding output power;

pulse generator means for generating a pulse at a point in time after said switching means closes as a function of the present value of said output voltage;

means for causing said pulse to be generated earlier when said output voltage drops below a predetermined minimum;

means for coupling said pulse to said electrical switching means, said pulse causing said electrical switching means to switch off; and means for switching on said electrical switching means at a point in time after the switching off of said switching means.

17. A DC power supply comprising:

a transformer having a primary winding and a secondary winding, one end of said primary winding being coupled to a source of DC;

electrical switching means coupled to the other end of said primary winding, said switching means when closed causing power to be stored in said transformer, and when open enabling said power to be output through said secondary winding;

rectifier means attached to said secondary winding for generating an output DC voltage from said secondary winding output power;

pulse generator means for generating a pulse at a point in time after said switching means closes as a function of the present value of said output voltage, wherein said pulse generator means comprises:

(i) means for comparing the output DC voltage level with an internal reference voltage and for producing an output error voltage that varies with the difference in amplitude between said compared voltages;

(ii) a control transistor, including a base, emitter and collector, said base bias controlled by said output error voltage;

(iii) ramp generator means for generating a ramp signal of increasing magnitude when said electrical switching means is closed; and (iv) means for coupling said ramp signal to the emitter of said control transistor, such that an output pulse is generated on the collector of said feedback transistor when the level of said ramp exceeds the base bias of said transistor;

means for causing said pulse to be generated earlier when said output voltage drops below a predetermined minimum, including second ramp generator means for generating a ramp signal of a predetermined slope, such that said control transistor is caused to turn on when said ramp voltage exceeds the bias voltage on the base of said transistor;

means for coupling said pulse to said electrical switching means, said pulse causing said electrical switching means to switch off; and means for switching on said electrical switching means at a point in time after the switching off of said switching means.

18. The DC power supply of claim 17 further comprising a first diode connected in series between said first ramp generator means and the collector of said control transistor, and a second diode connected in series between said second ramp generator means and the collector of said control transistor.

* * * * *